United States Patent [19]

Conover

[11] Patent Number: 4,509,247
[45] Date of Patent: Apr. 9, 1985

[54] MIG WELDING GUN

[75] Inventor: Michael S. Conover, Bartlesville, Okla.

[73] Assignee: K. C. Welding, Bartlesville, Okla.

[21] Appl. No.: 216,159

[22] Filed: Dec. 15, 1980

[51] Int. Cl.[3] .................. B22D 11/126; B22C 9/02
[52] U.S. Cl. ........................... 29/527.4; 29/527.3; 239/602; 239/DIG. 19; 164/34
[58] Field of Search ............... 29/527.4, 455, 527.2, 29/527.3, 527.5; 164/34, 35, 36; 239/602, DIG. 19

[56] References Cited

U.S. PATENT DOCUMENTS 3,892,028  7/1975  Dobler ........................... 29/527.4

OTHER PUBLICATIONS

*Investment Castings*, by Wood, R. L. and Von Ludwig, D., published 1952 by Reinhold Publishing Co., 330 W 42nd St., New York City, pp. 344, 345, 378, 379, 396, 397.
*Precision Metal Molding*, Oct. 1965, p. 49.
*Precision Investment Castings*, by Cady, E. L., published 1948, by Reinhold Publishing Corp., 330 W 42nd St., New York, N.Y., pp. 148–153.
*Foundry Trade Journal*, Mar. 5, 1964, pp. 302–304.

*Primary Examiner*—Howard N. Goldberg
*Assistant Examiner*—V. K. Rising
*Attorney, Agent, or Firm*—Head, Johnson & Stevenson

[57] ABSTRACT

A method of manufacturing the outer housing of a metal inert gas welding gun comprising an investment cast process which eliminates the necessity of providing a separately machined threaded end for the gun, thus providing a gun housing which is not only less expensive, but also much stronger than previously available gun housings of this type.

2 Claims, 3 Drawing Figures

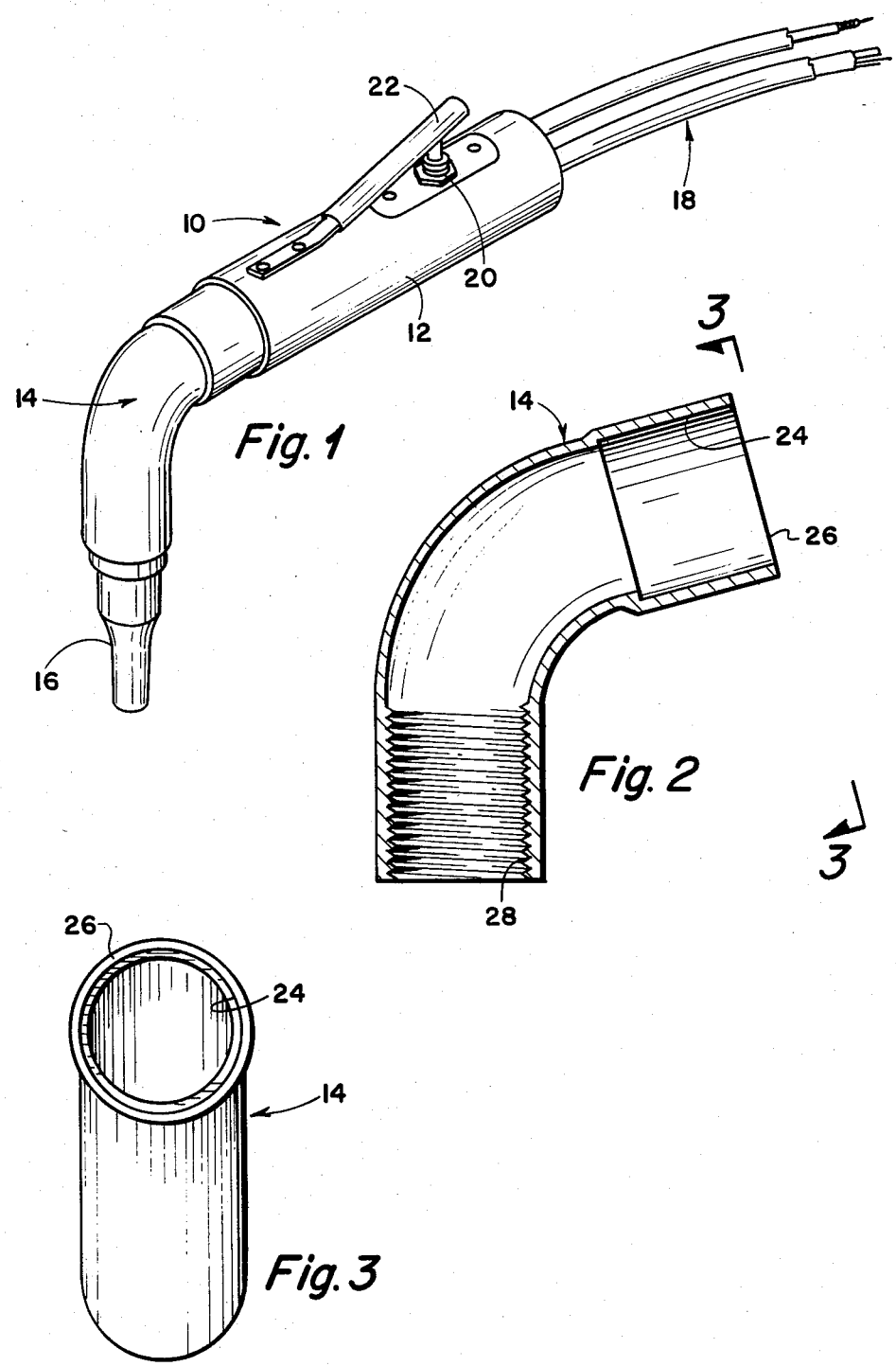

MIG WELDING GUN

BACKGROUND OF THE INVENTION

1. Field of the Invention

This invention relates to improvements in metal inert gas welding guns and more particularly, but not by way of limitation, to an improved method of manufacture of the outer housing for metal inert gas welding guns.

2. Description of the Prior Art

In the metal inert gas (commonly called MIG) welding industry, a welding gun is normally utilized which includes an outer housing of a substantially L-shaped configuration having one end secured to the handle member and a nozzle member secured to the opposite end thereof. These outer housings are normally fabricated or constructed from copper ells which are machined off to provide the desired overall length for the housing, and an internally threaded steel is usually secured to the outer end thereof by a silver brazing process. Not only is this an extremely expensive and slow operation, but also the brazing operation anneals the cooper material, thus rendering the housing prone to denting and deformation during use of the MIG welding gun. In addition, it is the usual practice to chrome plate the housing in order to obtain a suitable appearance for the part. The dissipation of heat in a MIG welding operation is very important, and the disadvantages of the present method of manufacture of the housings will be readily apparent.

SUMMARY OF THE INVENTION

The present invention contemplates a novel method of manufacturing the outer housing for a MIG welding gun and comprises an investment casting process for the fabrication of manufacture of the housing. The investment casting operation provides an extremely efficient and precise molding wherein the threads may be molded integrally with the molding of the L-shaped body, thus eliminating the need for silver brazing operation utilized in the presently available MIG gun housings. This provides a much less expensive method of manufacture for the housing, and in addition, the housing may be cast from investment cast material which is much more accurately formed than the previous copper ell material, and is exceedingly stronger than the previous material. It has been found that the gun housings constructed with this new method of manufacture are substantially indestructable. Furthermore, the completed housing is finished by a simple sand blasting operation, and painted with a high temperature resistent black paint which decreases the cost of manufacture, and increases the heat dissipation during use of the MIG gun, which is an important feature in a MIG welding operation. The novel method of manufacture of the outer housing of the MIG welding gun is simple and efficient, and provides an economical and durable end product.

BRIEF DESCRIPTION OF THE DRAWINGS

FIG. 1 is a perspective view of a MIG welding gun provided with an outer housing embodying the invention.

FIG. 2 is a sectional elevational view of a MIG welding gun outer housing embodying the invention.

FIG. 3 is a view taken on line 3—3 of FIG. 2.

DESCRIPTION OF THE PREFERRED EMBODIMENT

Referring to the drawings in detail, reference character 10 generally indicates a MIG welding gun comprising the usual substantially tubular housing 12 having a substantially L-shaped outer housing 14 secured in one end thereof, and a suitable nozzle means 16 threadedly secured to the outer or exposed end of the housing 14. The usual cable means 18 extend longitudinally through the handle 12 and housing 14 for connection with the nozzle 16 in the usual manner (not shown). A suitable switch means 20 is normally mounted on the handle member 12 and projects outwardly from the outer periphery thereof for actuation by a suitable actuator 22 which is yieldably mounted on the outer periphery of the handle 12 in any well known manner for manual depression for selective engagement of the switch 20 during operation of the MIG gun 10, as is well known.

The outer housing 14 is a unitary structure of a substantially L-shaped configuration and having a central passageway 24 extending longitudinally therethrough. One end 26 of the passageway 24 is open communication with the interior of the handle member 12 in the assembled position of the gun 10. The opposite end of the housing 14 is provided with internal threads as shown at 28 for threadedly receiving the nozzle 16 therein as is well known.

The housing 14 is constructed by a well known investment casting process wherein the entire housing is molded in the casting operation, including the substantially precise dimensions required for the housing 14 and the internal threads 28. An investment cast material of a suitable type is utilized, as is well known, and as a result the housing is of a relatively accurate dimensional and configurational construction without the necessity of additional machining. In addition, the investment cast material is stronger than the usual copper ell material from which presently available MIG welding guns are constructed. In fact, it has been found that the investment cast MIG gun outer housing 14 is substantially indestructible during any normal welding operation, or other normally utilization thereof.

Subsequent to the investment casting operation, the housing 14 is finished by sand blasting thereof in any well known or suitable manner, and subsequent to the sand blasting, the housing is painted with a suitable high temperature resistant black paint, thus increasing heat dissipation during a welding operation wherein the housing 14 is utilized.

From the foregoing it will be apparent that the present invention provides a novel method for fabrication or construction of the outer housing for a MIG welding gun, said method comprising molding of the housing by an investment casting process whereby the housing is exceedingly accurate in dimensional configuration. In addition, the housing is considerably stronger than presently available housing of this type, and the fabricated housing is ultimately sand blasted and painted with a suitable heat resistant black paint for increasing heat dissipation during the welding operation. In this manner a stronger, less expensive outer housing is provided which also increases the efficiency of the welding operation of the MIG welding gun.

Whereas the present invention has been described in particular relation to the drawings attached hereto, it should be understood that other and further modifications, apart from those shown or suggested herein may be made within the spirit and scope of this invention.

What is claimed is:

1. A method of manufacturing an outer housing for a MIG welding gun and comprising the steps of molding the housing by an investment casting process to provide an unitary structure having an integral internally threaded portion for threadedly receiving a nozzle therein, sand blasting the housing subsequent to the investment casting process, and painting the housing with a suitable heat resistant paint subsequent to the sand blasting operation.

2. A method of manufacturing an outer housing for a MIG welding gun as set forth in claim 1 wherein the heat resistant paint is black in color for increasing dissipation of heat during use of the MIG welding gun.

* * * * *